US00RE35326E

United States Patent [19]

Richburg

[11] E Patent Number: Re. 35,326

[45] Reissued Date of Patent: Sep. 3, 1996

[54] MEAT DEBONING APPARATUS AND METHOD

[76] Inventor: James B. Richburg, 101 Pumpkin La., Sumter, S.C. 29150

[21] Appl. No.: 332,945

[22] Filed: Nov. 1, 1994

Related U.S. Patent Documents

Reissue of:

[64] Patent No.: 5,160,290
Issued: Nov. 3, 1992
Appl. No.: 625,412
Filed: Dec. 11, 1990

[51] Int. Cl.[6] ..... B02C 23/16

[52] U.S. Cl. ..... 452/135; 452/138; 241/24.26

[58] Field of Search ..... 452/138, 135; 241/24

[56] References Cited

U.S. PATENT DOCUMENTS

| | | | |
|---|---|---|---|
| 4,025,001 | 5/1977 | Yarem et al. | 452/138 |
| 4,042,176 | 8/1977 | Beck et al. | 241/24 |
| 4,516,731 | 5/1985 | Prince et al. | 241/24 |
| 4,536,920 | 8/1985 | Amersfoort | 241/24 |
| 4,824,027 | 4/1989 | Shaw et al. | 241/24 |

*Primary Examiner*—Willis Little
*Attorney, Agent, or Firm*—Cort Flint

[57] ABSTRACT

An apparatus and method for a meat deboning machine are disclosed of the type which includes a drive motor with a motor shaft, an auger for conveying meat and bone material product, and a motor coupling for coupling the auger to the drive motor shaft. A housing surrounds the auger which includes a feed can having an inlet into which the product is fed to an entry end of the auger, and a sieve screen through which the meat passes radially to separate from the bone material. The auger includes two sections consisting of a feed auger and a compression auger which have a continuous taper and flights when coupled together as a single auger. The flights have an increased depth, to receive more product with reduced cavitation and pressure. The inlet of the feed can feeds only a single entry flight of the auger so that product does not back up into the feed opening. The root of the auger has a taper of about 9° so that a deep entry flight is provided at the entry end which can receive more product than is capable of being fed to the auger. Both the feed auger shaft and the compression auger shaft are provided with slidable couplings so that no threads are used. The feed auger section and the compression auger section are advantageously machined from a one-piece stock of tool steel so that the root and flights of the auger are one piece. This eliminates welds and enhances the sanitation of the auger.

84 Claims, 5 Drawing Sheets

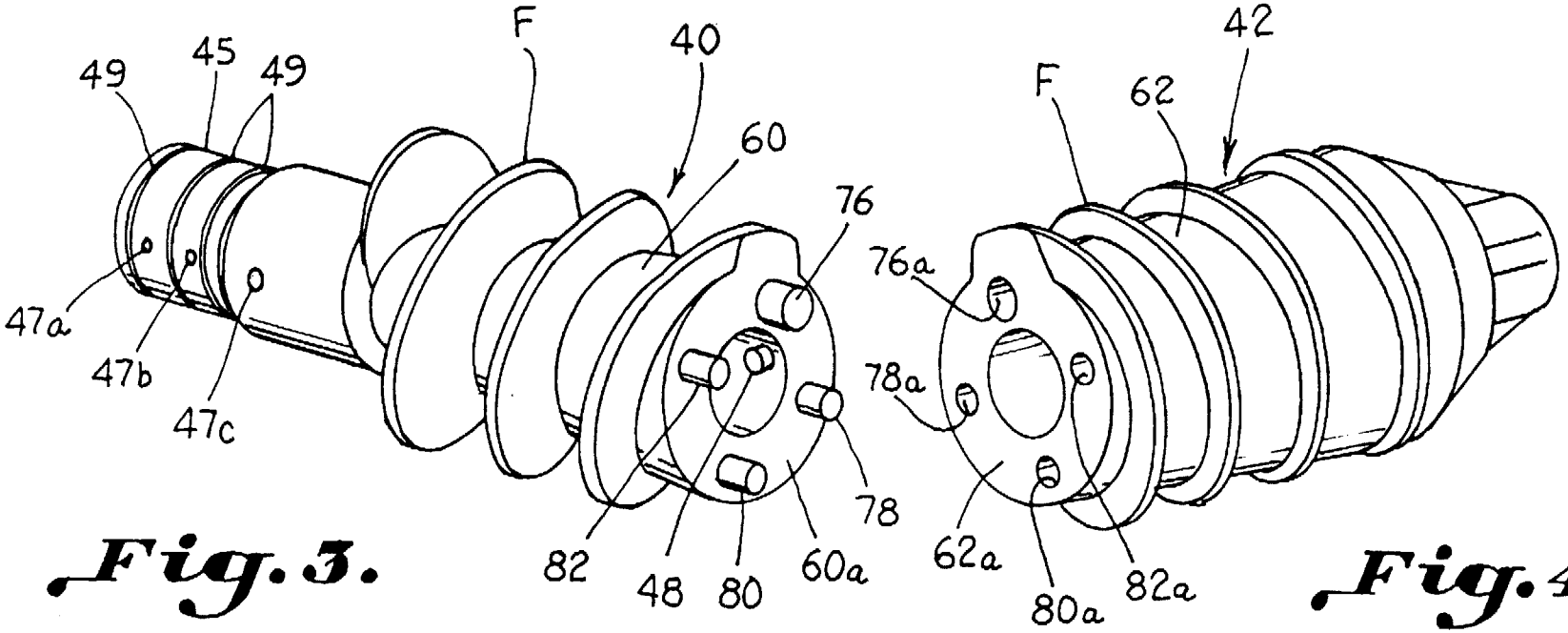
Fig. 4.
Fig. 3.
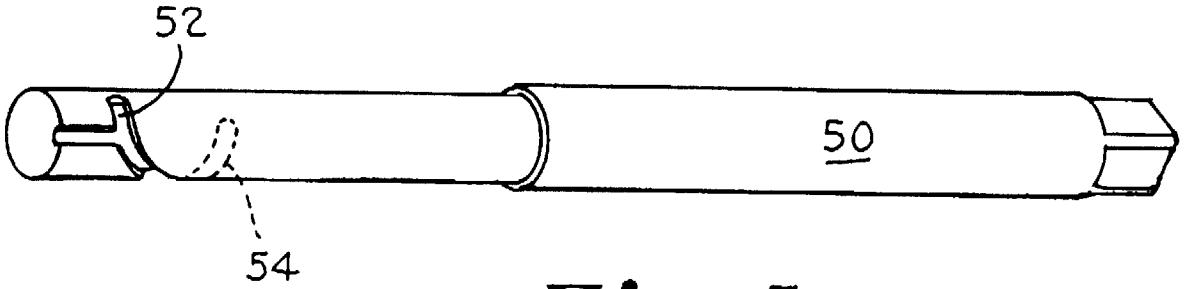
Fig. 5.

Fig. 7.
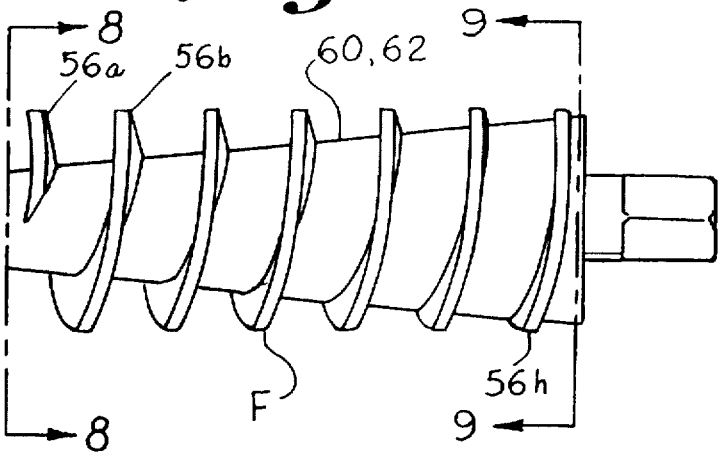
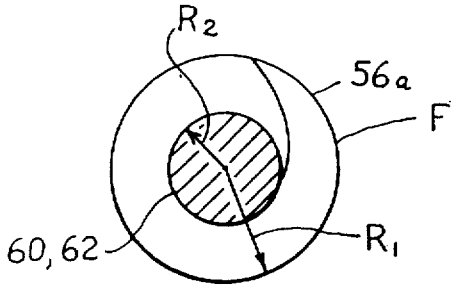
Fig. 8.
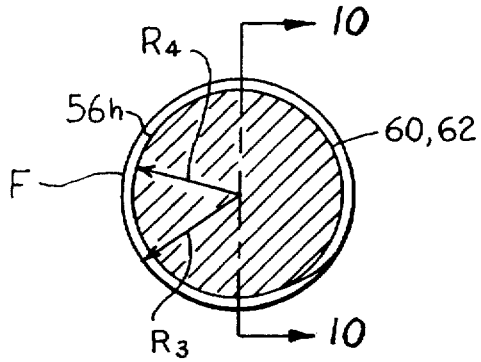
Fig. 9.
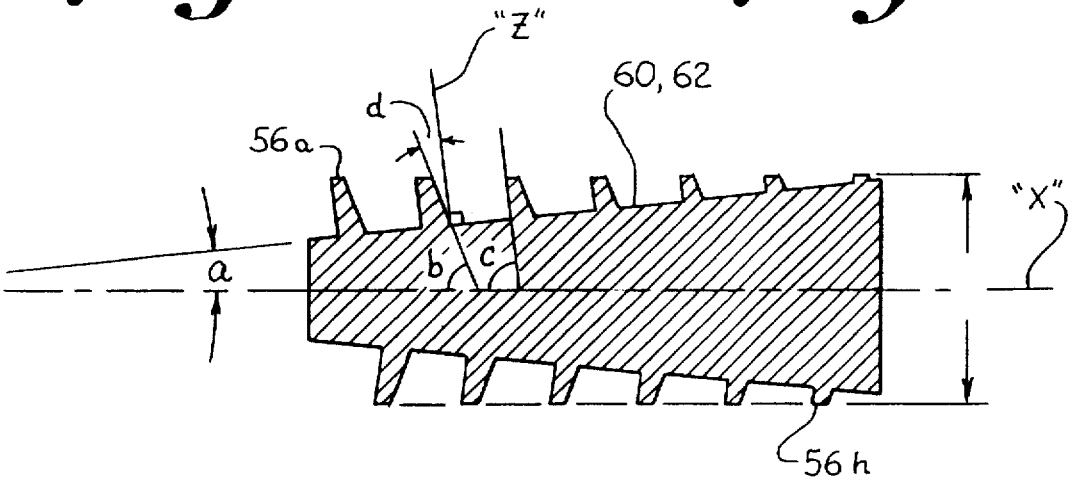
Fig. 10.

MEAT DEBONING APPARATUS AND METHOD

Matter enclosed in heavy brackets [ ] appears in the original patent but forms no part of this reissue specification; matter printed in italics indicates the additions made by reissue.

BACKGROUND OF THE INVENTION

The invention relates to apparatus and method for deboning meat of the type which separates meat from bony material by passing the meat radially through a sieve screen and the bony material axially through an outlet.

In the prior art meat deboning apparatus, an auger is utilized to compress and convey the meat and bone material axially through a sieve screen where the compressed meat passes through the sieve screen and the bony material is conveyed through an outlet at the end of the sieve screen For example, see U.S. Pat. Nos. 4,042,176 and 4,824,027. Some augers are made of a stainless steel with the flights of the auger welded to the root of the auger. Due to the properties of stainless steel, the metal infiltrates into the meat product more quickly than some other more suitable steels. The stainless steel is porous so that bacteria may find its way into the pores of the metal. In the welding process, if 100% penetration of the weld is not achieved, voids exist in the welds which harbor bacteria The bacteria harbored in the stainless steel material and in the welds can lead to uncleanliness. In reworking the fabricated augers, the presence of bacteria is quickly and obviously found by the stench emitted when heat is applied, to the auger during reworking. It is not possible to wash out the fluids and bacteria retained in the welds and cracks during normal clean up procedures. Some prior art auger flights and roots have also been overlayed by welding with a hard surface material containing cobalt which is a contaminant. Due to the pliability of the base metal, the overlay will crack and allow metal to enter the meat product The prior art stainless steel has little wet abrasion resistance so that the edges of the flight erode inward beneath the hardened surface of the flights allowing the surface material to break off and damage the sieve screen. High chromium stainless steel is subject to hydrogen embrittlement which causes it to lose ductility and crack with shock. Further, capitation will cause the protective film on high chromium stainless steel to be lost allowing erosion to rapidly take place and infiltrate metal into the product.

The helical flights on the prior art augers are either perpendicular to the axis of the auger or lean toward the exit end. This creates an impediment to radial flow on the front face of the flights and causes turbulence. The rear face is unable to retain product against it until the product reaches the outside diameter of the flight. Therefore, it cannot act as a slinger and impart maximum velocity to the product as it heads toward the screen. Meat and boric product is fed to the feed auger in an area which covers more than one auger flight. This allows pressure relief in the subsequent flights if the flight is full of product and centripetal force tends to push the product back up the entry pipe if it opens over a second or third flight. It has also been typical to use a shallow flight at the entry of the feed auger which reduces its loading capacity and the flight must cut off the product at the entry opening of the feed can more times for the same mount of infeed product thus increasing horse power requirements, as well as pulsing and cavitation. Typically, the feed auger is threaded into the motor coupling which creates assembly and disassembly problems and misalignment due to the threads cocking. In the typical meat deboning apparatus such as shown in U.S. Pat. No. 4,042,176 the auger must be provided in 2 sections, a feed auger and a compression auger for assembly in the unit. The feed and compression augers include auger roots with different tapers and flights with different configurations which do not produce the most efficient results. When the taper changes as the product passes from the feed auger to the compression auger, turbulence and cavitation cause a diminished product flow and increased temperature in the product. U.S. Pat. No. 4,638,954 discloses a compression auger having a root with a fairly uniform root section (FIG. 1) but the compression auger is one-piece and a separate feed auger is utilized in another section of the machine. U.S. Pat. No. 4,069,980 discloses a compression auger having a relatively uniform taper in combination with a feed auger where the feed and compression auger tapers are not constant. Typically, prior deboning apparatus have taught high pressures wherein compressive forces are exerted on the product from 1000 psi to above 10,000 psi which creates considerable problems in the functioning and proper sealing of the housings and bearings of the apparatus which can lead to overheated, inferior final meat product, and mechanical failure of the apparatus.

Accordingly, an important object of the present invention is to provide a meat deboning apparatus which operates at increased capacity and decreased temperatures and pressure for producing a better qualify product.

Another object of the invention is to provide a meat deboning apparatus having an improved auger which includes a separate feed auger and a compression auger coupled as a unit wherein the auger has a constant taper over the entire length of the combined feed and compression auger and deep-flights which handle increased amounts of product with reduced cavitation and temperature.

Another object of the present invention is to provide an improved meat deboning apparatus wherein the drive shaft of the apparatus is provided with improved bearings that allow the shaft to become half-aligned for more trouble free operation.

Another object of the invention is to provide a meat deboning apparatus having an improved auger which eliminates welding in the construction and is constructed from non-porous material so that the harboring of bacteria is reduced and the apparatus is more sanitary.

Still another important object of the present invention is to provide a meat deboning apparatus having an improved auger wherein the front faces of the flights of the auger are leaned rearward toward the entry end to prevent washing of the shear edges of the flights to provide superior shear action and meat separation in conjunction with the increased depth of the flights to increase production.

Still another important object of the present invention is to provide a meat deboning apparatus having an improved infeed opening to the entry end of the feed auger which, together with auger flights having increased depth and rearward tilt, provides a more efficient feeding of product at increased velocity of least 1.5 to 1 due to the orifice effect through the entry end of the feed auger and throughout the deboning housing.

Another object of the invention is to provide an improved meat deboning apparatus having improved coupling of the different shafts and auger sections in the apparatus so that they are self-aligning and require only a sliding fit which eliminate motor bearing failure, threads, and misalignment due to thread cocking.

Another object of the invention is to provide a meat deboning apparatus having an improved auger which includes feed auger and compression auger sections wherein the root of the feed and compression augers have a continuous taper that the product does not have to change directions when passing from the feed auger to the compression auger simulating a one-pixel auger without the problems meat with a one-piece auger such as weight and attendant cumbersome assembly and disassembly.

Another object of the present invention is to provide a meat deboning apparatus having a housing which contains a feed auger and a compression auger wherein the operating pressures within the housing are reduced so that the feed auger may be fed product more efficiently yet the production rate of the apparatus is still increased.

Yet another object of the invention is to provide a meat deboning apparatus having a front bar support assembly which maintains a front sliding block assembly in alignment which supports one end of the sieve screen.

SUMMARY OF THE INVENTION

The above objectives are accomplished and problems eliminated according to the print invention by machining a feed auger section and a compression auger section of a meat deboning auger from an H13 tool steel which is not welded. The steel, largely used for casting aluminum products, has non-washing, toughness, good edging, and shock resistant characteristics. H13 steel is tough, will bend before it breaks, has excellent wet abrasion resistance in auger applications, and tends to polish which reduces friction, and hence reduces wear, H13 resists cavitation erosion and hydrogen embrittlement due to its low to medium chromium content. The mechanical and thermal shock characteristics are excellent. It can be hardened to 54 on the C-scale and with coating has a surface hardness of 72 on the C-scale. This combination does not exhibit the flight edge problems found in prior meat deboning augers or the cracking/heat check problems found on prior augers. In the application to a meat deboning auger. H13 steel outperforms the others due to its toughness and tensile strength even though it is not as hardenable or has the dry abrasion resistance as others. H13 matches the job requirements best, including sanitary requirements. The invention includes a meat deboning apparatus which separates meat from bone material where the apparatus is of the type having a drive motor with a motor shaft. An auger for conveying meal and bone material is provided which includes a motor coupling for coupling the auger to the motor shaft, a housing surrounding the auger including a feed can having an inlet into which the meat and bone material are fed to an entry end of the auger, and a sieve screen through which the meat passes to separate meat from the bone material. An outlet is carried by the housing through which the bone material passes after separation from the meat auger has a plurality of sections which includes feed auger and a impression auger integrally coupled together. The feed auger and compression auger have a continuous tapered root along substantially their entire coupled total length. Flights are carried by the auger root which have a depth in a range of about 1.0 inch to 1.8 inches the entry end. The flights have a constant outside diameter along the total length of the feed auger and compression auger. There is a cross-section area ratio change of greater than 2.3:1 and preferably approximately 8:1 over the length of the auger, from the entry to the exit ends, due to the change in root diameters. Cross-section area ratio is the ratio of the area of the outside diameter of the flight to the area of the outside diameter of the root at a point along the length of the auger. Cross-section area ratio charge is the cross-section area ratio at one point on the auger's length divided by the cross-section area ratio at a different point or the auger's length. The points referred to are the entry and exit points. Prior art augers typically exhibit a cross-section area ratio change of less than 2.2 to 1 over the length of the auger. The flights and tapered root of the feed auger and compression auger are constructed as one-piece which eliminates welds between the auger flights and auger root and enhances the sanitation of the auger. The auger is constructed from an H13 tool steel material. The feed compression auger are heat treated and include a non-porous coating having a hardness of approximately 72 on the C scale which reduces friction and horse power requirements. The front faces of the flights of the augers are inclined toward the entry end of the auger, i.e. at an angle of about 0.1° or more, preferably 15° to 18°, assisting the outward flow of material toward the sieve screen. The rear faces of the flights are inclined toward the entry end of the auger at an angle of 0.1° or more, preferably about 9°. This helps retain material behind the flight as evident by the fact that there is far more wear on the trailing edge of the rear face of the flight than there is on the shear edge of the front face of the flight.

The motor coupling includes a plurality of drive pins carried by one motor coupling and feed auger, and a plurality of corresponding drive holes carried by the other motor coupling and feed auger which mate together to couple the motor coupling and feed auger together and provide a slip fit which holds the motor coupling and feed auger in place by the pressure from the operation of the auger and which facilitates quick disassembly and assembly of the auger. The motor coupling includes a housing shaft which has a drive socket formed therein, and the feed auger includes a stub shaft which fits in the socket and includes at least one longitudinal bore, and at least one substantially radial bore communicating with the longitudinal bore to ambient conditions to relieve air in the socket when the motor coupling and auger are fitted together axially. The feed auger has a first coupling end and the compression auger has a second coupling end for mating with the first coupling end of the feed auger so that the auger root has a continuous taper and flight. An auger shaft extends through the compression auger and connects to the feed auger, and the auger shaft has a spiral groove carried on one end. A hollow bore is formed within the feed auger, and a locking pin extends radially within the hollow bore for engaging within the spiral groove of the auger shaft and connects the compression auger, feed auger, and auger shaft together. An auger coupling couples the first coupling end of the feed auger and the second coupling end of the compression auger together. The spiral groove of the auger shaft comprise an extended groove portion which prevents the auger shaft from becoming unlocked in the event that the drive motor is operated in a reverse direction. The auger coupling comprises a plurality of coupling pins carried by the feed auger, and a plurality of corresponding coupling holes formed in the compression auger which mate to lock the feed auger and compression auger together in a drive connection. One coupling pin and hole has a different configuration from the other coupling pins and holes to align the feed and compression augers. The auger root has a taper which is greater than about 5° and is continuous along the length of the feed auger and compression auger so that the flights of the auger means at the entry end are substantially deeper than at the exit end to allow more meat and bone material to be introduced to the first cavity of the auger flights. Preferably, the auger root has a taper of about 9° relative to the axis of the auger, and the flights of the auger have an outside diameter of about 5 inches. The feed can inlet includes a reduced eccentric opening or orifice plate whose opening is oriented to the rear disposed near the entry end of the feed auger to increase the loading capacity of the feed auger by increasing velocity due to the orifice effect. The feed can inlet of the housing includes an entry opening disposed relative to the auger for introducing meat and bone material into only one flight of the auger to prevent subsequent pressure relief and back-up of the product in the inlet. A bearing housing is provided which includes a housing shaft carried within the bearing housing. A first bearing is carried by a first end of the housing, and a second bearing is carried by a second end of the housing. A thrust bearing is carried by an intermediate portion of the housing whereby the drive shaft is carried by first and second bearings for rotation and against axial thrust by the thrust bearing. Mounting blocks are provided for mounting the bearing housing to an associated frame and engaging the bearing housing in a friction fit heat exchange contact which transfers heat from the bearing housing to ambient environment. An oil bath is carried within the bearing housing for cooling the bearings and housing shaft so that the bearing housing effectively serves as a heat sink to remove heat through the oil, the housing, and the mounting blocks to ambient. The bearing housing includes a breather means for allowing the oil bath in the bearing housing to communicate with the ambient environment. The motor coupling comprises a flexible coupling means for coupling the drive motor shaft and the housing shaft and for allowing the motor shaft to find and operate toward its magnetic center. Longitudinal adjustment means is carried by the flexible coupling allowing the housing shaft to move with the motor shaft at magnetic center and pre-load the thrust bearing when the motor shaft is located at the magnetic center.

The long life, wear patterns, auger flight and root configuration, and low pressure, indicate that the movement of material in the auger with rearward leaning flights in the present invention is different from augers with forward leaning flights Based on the above and the fact that the trailing edge of the rear face of the flight and the root at the rear face of the flight wear, the motion can be properly described as follows when the throttling ring valve is properly adjusted to allow the bone to escape. When the material enters the entry end of the auger, it is directed to the root by the sloping front face of the flight. Once it has reached the root it is directed up the rear face of the flight to the outside diameter of the feed can or is immediately slung outward by centripetal force. In either case it goes to the outside. Because the volume available per revolution is greater than the volume fed to the auger, compression will not take place immediately. The fluids are directed to the outside and remain there until they reach the screen where they exit first. By the time the material has reached the screen, the root diameter has increased enough to allow the material to begin filling the cavity between the flights if enough has entered the system. Otherwise, this will begin to take place further along the length of the auger. If the auger flight is not filled, the particles will stay on the outside and travel in a spiral motion around the inside of the screen as they ride on the top of the front face of the flight. The wedge action of the front face may force material through the screen and then shear some of it off, but not much happens until the root stems compressing the material. This is evidenced by observing that nothing but fluids come out of the entry end of the screen and finished product comes out of the exit end of the screen when the deboner is underfed. The degree of underfeeding will cause this effect to be more or less pronounced. The pulsing of the power used in this condition serves to further corroborate this observation. At the point when the material starts to fill the cavity between the flights several things happen. In the area of the auger near the entry end, material is held against the rearward sloping rear face more effectively than against a forward sloping rear face, thus allowing the material to increase its velocity more as it approaches the outside diameter of the flight before being slung into the screen. The kinetic energy imparted changes as the square of velocity so a small velocity change results in a relatively larger kinetic energy resulting in a relatively larger productivity increase. The continually decreasing area ratio causes a gradual increase of root surface velocity at the rear face of the flight which assists in imparting greater energy to the particles slung off the rear face of the flights. As the material feels mild compression, it moves up the front face of the flight in a spiral motion toward the exit end. This motion is forward with respect to the axis but it would appear rearward to an observer travelling at the root of the leading edge of the flight beneath the particle being observed. Material on the front face of the flight is directed forward and outward by centripetal force and the wedging action of the rearward leaning flight face against the screen. As the particles being processed move further along the length of the auger toward the exit end, they lose mass through the screen as they are sheared off by the leading face shear edge of the flight, and become relatively lighter than particles not so far into the reparation process. As a result, the relatively heavier particles being wedged and slung into the screen displace the relatively lighter more completely separated particles ahead of them forward and toward the root in a spiral path relative to the screen. This happens because centripetal force is proportional to mass, and the relatively lighter particles, although they are feeling an outward force literally float to the inside, because they are displaced by heavier particles which feel greater forces. The root continues to get larger as the exit end approaches allowing the material to continue to fill the cavity if it is adequately fed. Toward the exit end of the auger, the area at the root near the trailing edge becomes quite turbulent and has relatively lower pressure than the area near the screen. As a result, the relatively lighter separated bone particles enter the area due to displacement and the cavitation causes erosion and the bone further wears the area. Because inward displacement forces are greater than the outward centripetal force on the relatively lighter particles the separated bone contained within the screen is forced to congregate near the root of the training edge of the flight and follow it to the exit end. The result is a lower bone count and lower temperature rise in the finished product since the bone stays near the root acts as a heat sink. This action is verified by observing that the root of the auger near the trailing face of the flight is worn much more than the middle of the trailing face, and the fact that it becomes more severe as the exit end of the auger is approached. Because it takes very little pressure to force meat through an orifice an the screen and because the screen is vented to atmosphere, and because the system is never filled, the pressure cannot build to a significant mount as long as the throttling ring valve is properly adjusted. This action (See Yarem, et at., U.S. Pat. No. 4,069,9890 for further description of the action in a forward learning flighted auger.) is just the opposite of a forward leaning flight which directs material forward and down to the root and forward toward the rear face of the flight ahead of it where the material heads outward to the screen and waits for the leading edge to pick it up again. The wear appears on the front face of the flight and the shear edge is dulled rapidly.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 3 is a perspective view of the coupling end of a feed auger according to the invention;

FIG. 4 is a perspective view of the coupling end of a compression auger according to the invention;

FIG. 5 is a perspective view of an auger shaft according to the invention;

FIG. 7 is a side elevation or an auger constructed in accordance with the invention;

FIG. 8 is a sectional view taken along line 8—8 of FIG. 7;

FIG. 9 is a sectional view taken along line 9—9 of FIG. 7;

FIG. 10 is a side elevation illustrating the angular orientations of flights and root taper for an exemplary auger constructed according to the present invention.

DESCRIPTION OF A PREFERRED EMBODIMENT

Figure 1:
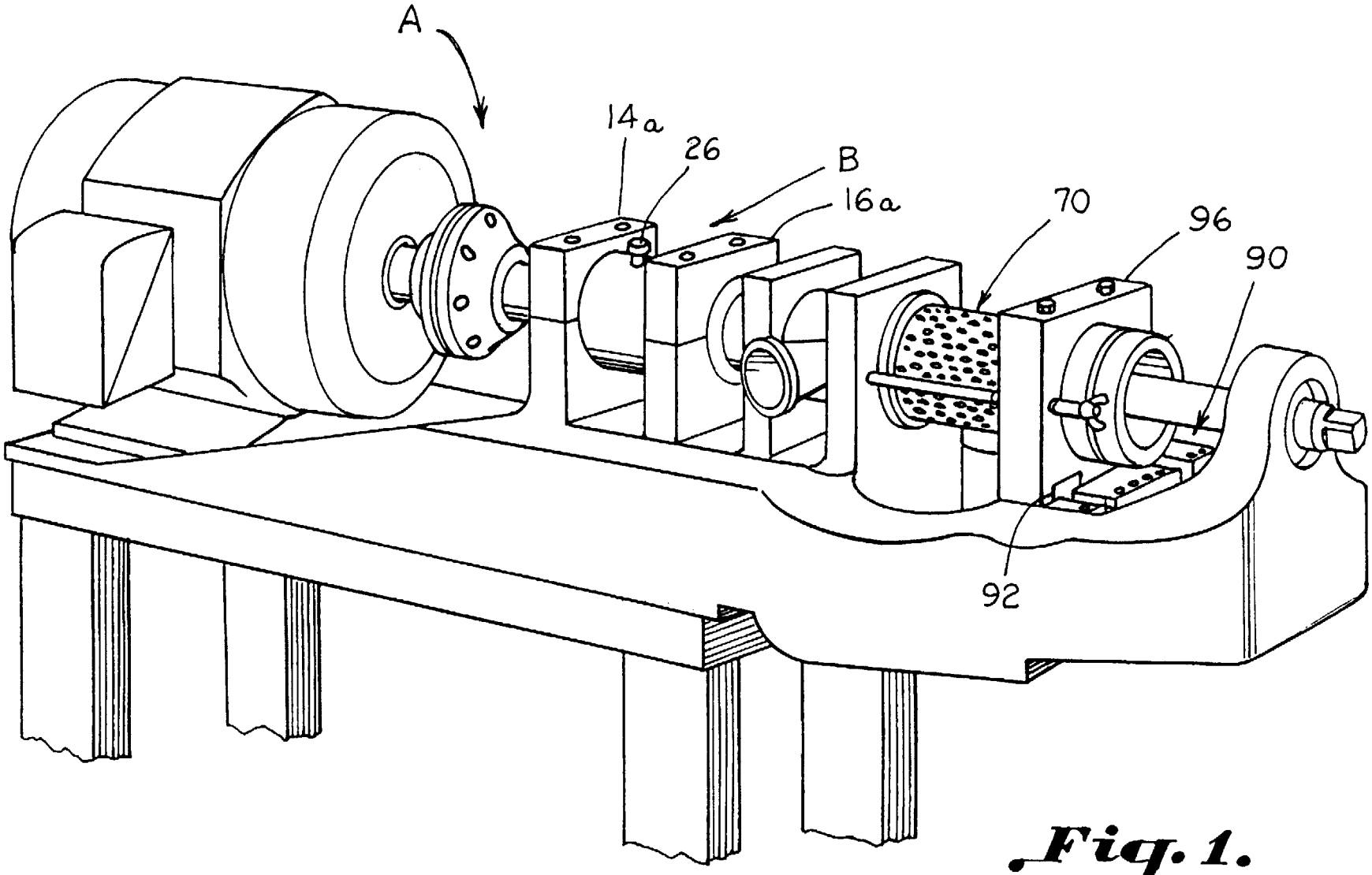
FIG. 1 is a perspective view of a meat deboning apparatus according to the invention.

Referring now in more detail to the drawings, a meat deboning apparatus A is illustrated which includes a drive motor assembly 10, and a housing shaft 12 mounted in a bearing housing assembly B which is coupled to the drive motor assembly. Housing assembly B is compressed between two aluminum supports 14 and 16 and caps 14a and 16a. A friction lock is obtained which is greater than the axial thrust or the torque generated when the machine is at worst case loading conditions. The aluminum supports and bolted down caps 14a and 16a arc heat sinks for housing assembly B. This increases bearing life by reducing their temperatures. There are three bearings supporting shaft 12 in the housing; two radial bearings 18 and 20 on the ends, and a thrust bearing 22 in the middle. Thrust bearing 22 includes an inner race 22a mounted by a shoulder 22b on the shaft, and an outer race 22c is mounted on a shoulder 22d in the housing. The shaft and three bearings share a common oil bath 24 in the housing. The oil serves as a lubricant and to carry heat away from the components to the heat sinks where it is dissipated to 15 the atmosphere. This reduces heat and increases bearing life. The housing assembly is a sealed unit without threads so it is quite sanitary. The bearings used in this assembly are rated for speeds in excess of the operating speed. The thrust bearing assembly found in prior deboning apparatus is rated for about 238 rpm even though the machine is operated at 1170 rpm. These bearings fail quickly due to the severe misapplication of them. A breather assembly 26 of the housing allows excess oil to escape preventing over lubrication and excessive bearing temperature. The breather prevents a vacuum from forming when the machine cools, thus preventing water from being drawn past the seals into the unit. The use of precision, high speed self aligning bearings 18, 20 on the ends causes the shaft to be self centered in the housing at operating speeds and establishes perfect alignment for thrust bearing 22 which is mounted between them. This assures long thrust bearing life and allows the use of an inexpensive deep groove ball bearing for thrust bearing 22. At static conditions, the internal bearing clearances allow greater shaft run-out than when operating at full speed.

The invention includes pre-loading thrust bearing 22 by using a flexible coupling C such as Browning flexible coupling halves 30, 32 fastened to a motor shaft 34 of motor assembly 10 and housing shaft 12 with a small gap 36 between the halves. The coupling halves are then bolted together. This causes the motor shaft 34 and housing shaft 12 to be pulled toward each other. When the motor is started, the motor rotor will seek its magnetic center and pull motor shaft 34 into that position, thus pulling on housing shaft 12 and pre-loading thrust bearing 22. The degree of pre-loading can be controlled by changing gap 36 separating the coupling halves. An important benefit is that this allows the motor to operate at its magnetic center. Thrust bearing outer race 22c floats in the housing and is held in place without rotation against shoulder 21d by the pre-load established at installation and motor start-up. This motor end bearing housing arrangement, with a dual pin drive, allows both the feed and compression augers to float axially toward the thrust bearing when loaded.

An auger D is disclosed having a feed auger 40 and a compression auger 42 constructed from a non-rusting material having the quality of non-washing since poultry and turkey are about 70 percent water. The excellent edging quality of the material allows long life on the shearing edge of the flights. The close grain structure and superior non-cracking qualities prevent bacteria from penetrating the metal. The augers are machined on a milling machine from a solid piece of metal. The auger may be machined on any suitable milling machine such as a Super Max machine manufactured by Y.C.I. of Compton, Calif. No welds are used to attach flights thus enhancing their sanitation level, ease of cleaning and corrosion resistance. Additionally, they are heat treated, ground, and polished. They are coated with a non-porous coating (TDC-I) which has a hardness of 72 on the C scale. This coating reduces friction which further reduces horsepower requirements. On the exit end of the compression auger, the coating will eventually be worn away. The exposed metal surface has a good wet abrasion and non-washing characteristics to enhance wear resistance. This means that there will be less metal infiltration into the product than augers made of stainless steel. The auger flights on prior art augers are either perpendicular to the axis of the auger or leaned toward the exit end. This creates an impediment to radial flow and causes turbulence. Auger D includes flights F which are machined deep into the auger and whose front faces lean toward the entry end with respect to the auger axis "X" assisting the outward flow of material toward the sieve screen. This is a major advantage since the washing effect of the product on the shearing edge is diminished, thus resulting in longer shear edge life. Additionally the diminished cavitation reduces excess material contact with the shear edges thus enhancing auger life. Tests have shown an auger life increase of 3 to 1 over competitive augers.

Figure 2:
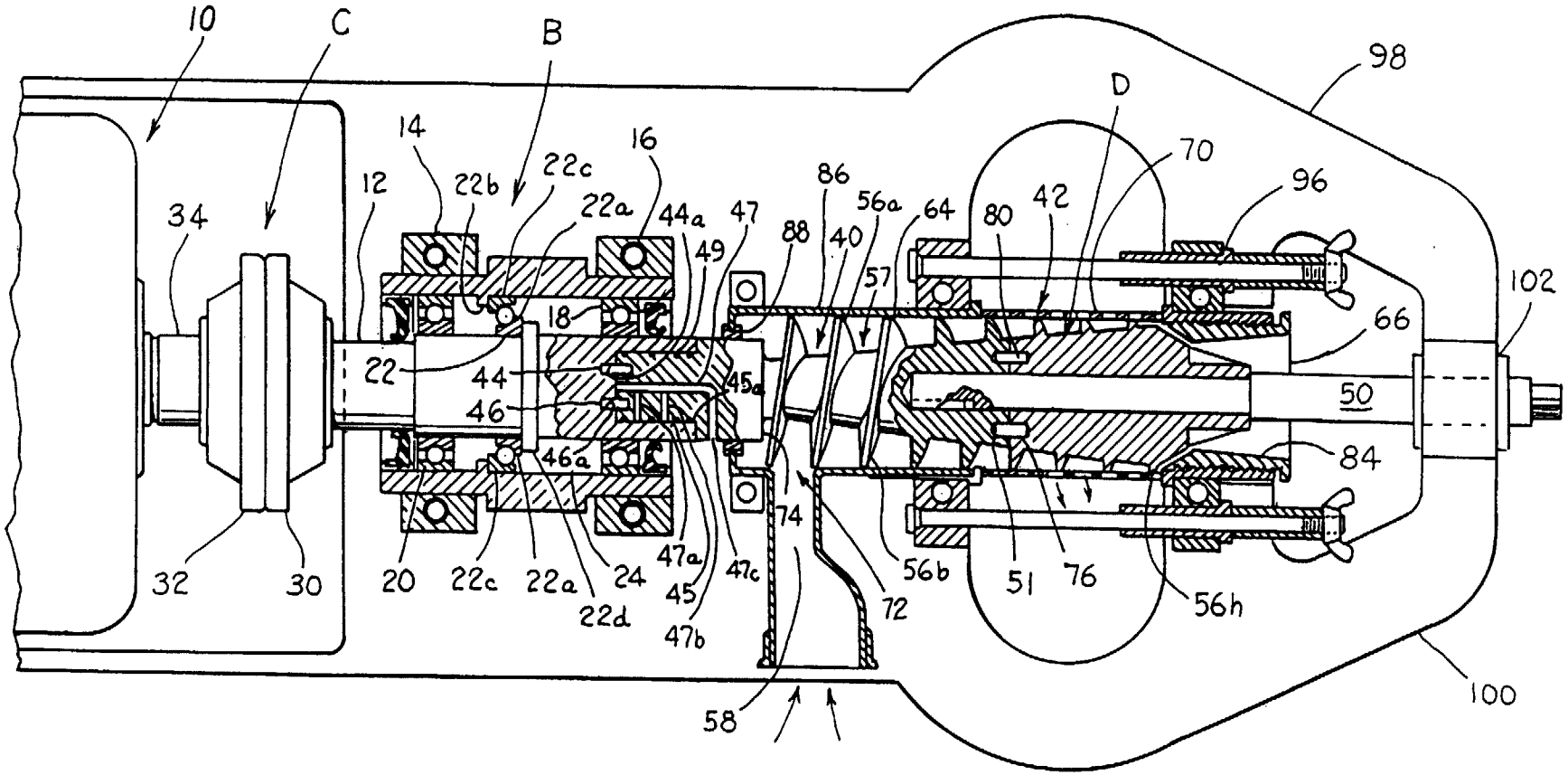
FIG. 2 is a sectional view of a meat deboning apparatus according to the invention.
Figure 6:
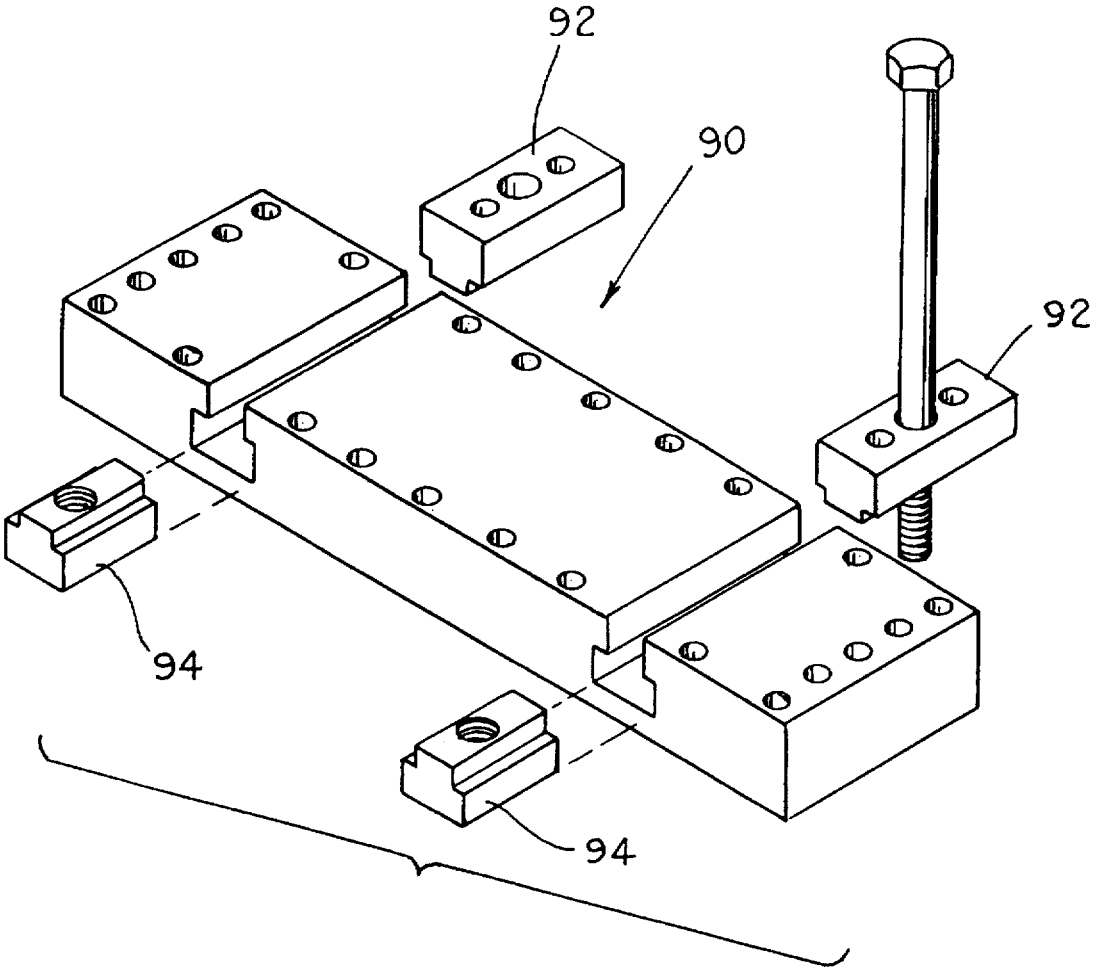
FIG. 6 is a perspective view of a T-slot bar assembly according to the invention.

Feed auger 40 is driven by two hardened and ground drive pins 44 and 46 which are diametrically opposed and fit into two corresponding holes 44a and 46a in housing shaft 12. This allows the slip fit to be held in place by the pressure from the augers during operation, and to be quickly disassembled and assembled. Threading of the drive shaft is eliminated. This eliminates problems with assembly, disassembly, and misalignment due to the threads cocking. For this purpose, feed auger 40 includes a stub shaft 45 having a reduced diameter which fits in a socket 45a formed in housing shaft 12. While the drive pins and drive holes may be carried and formed by the opposite pans, it is preferred that the drive pins be carried by stub shaft 45 and that the corresponding openings be formed in the bottom of socket 45a. To further facilitate this sliding fit, there is at least one axial bore 47 formed in stub shaft 45 which opens to the - outside. There are a plurality of radial bores 47a and 47b which communicate with axial bore 47 and the outside of stub shaft 45. Radial bores 47a and 47b open between rubber O-rings 49. This allows pressure within socket 45a to be relieved through the axial bore 47 to the ambient through opening 41c of axial bore 47. Openings 47a and 47b vent the space between the O-rings as the stub shaft is inserted into the socket to further relieve pressure and break any suction or vacuum that should exist in the socket to facilitate the sliding fit, as can best be seen in FIGS. 2 and 3. Rubber O rings 49 prevent metal to metal contact between socket 45a and stub shaft 45 and equalize radial force between socket 45a and stub shaft 45 thus assuring proper axial alignment of the feed auger 40 while the machine is below operating temperature. At operating temperature the internal clearances between stub shaft 45 and socket 45a diminish, allowing metal to metal contact which assures proper alignment of feed auger 40.

Threads are also eliminated on the exit end of the feed auger. The auger shaft is held in place by a hardened and ground locking pin 48 placed radially on the auger shaft fit. An auger shaft 50, which is used to support and align compression auger 42, includes a spiral groove 52 to accommodate pin 48. Pin 48, in conjunction with spiral groove 52 on the auger shaft, prevents the shaft from being galled during operation. An extended portion 54 of the spiral groove prevents auger shaft 50 from becoming unlocked in the event of a motor reversal. This is an important safety factor. During operation auger shaft 50 is normally pulled toward feed auger 40 by pin 48 and spiral groove 52.

The taper on the feed auger 40 is continuous over the length of its root. In the illustrated embodiment, the taper is 9° relative to the axis (18° included angle). This allows flights F to be much deeper at entry 58 than competitive units, thus allowing more product to be introduced into only a single cavity 57 between a first flight 56a and a second flight 56b of flights F. Rights F preferably have a depth of about 1.0 to 1.8 inches at entry end flight 56a, and a depth of about 0.25 inches at exit flight 56h. Preferably, the depth of entry flight 56a is about 1.7 inches and the depth of exit flight 56h is about 0.25 inches at a root taper of about 9° and outside flight diameter of about 5.0 inches.

The auger in accordance with the present invention is best understood by reference to the cross-section area ratios of the root 60, 62 and flights F at different points along the length of the auger, as can best be seen in FIGS. 7–10. In particular, the cross-section area ratio at the entry end and at the exit end of the auger are definitive. As can best be seen in FIGS. 8 and 9, the cross-section area ratio at the entry end is defined by the equation $A_1=R_1^2/R_2^2$, and the cross-section area ratio at the entry end is defined as $A_2=R_3^2/R_4^2$. Next, the cross-section area ratio change from the entry end to the exit end is defined as $A_1/A_2$. In the above example, $R_1$ and $R_3$ will be equal. Thus, the cross-section area change becomes $R_4^2/R_2^2$. In one example of the invention, $R_1$ and $R_3$ equal 2.485", $R_2$ equals 0.8" and $R_4$ equals 2.281". This results in a cross-section area ratio of $A_1$ equals 9.648 and $A_2$ equals 1.186. This defines a cross-section ratio area change from the entry end to the exit end of approximately 8.129:1. This illustrated embodiment is for exemplary purposes only and not for limatation. While a cross-section area ratio change of about 8:1 is preferred, it is contemplated that the advantages of the invention may be had with any cross-section area ratio change greater than 2.3:1 taking into consideration the deeper entry flights, constant taper along the auger, and other expedients of the invention. The use of deep flights reduces the weight, facilitating assembly. Auger D weighs about one third less than conventional augers.

Figure 11:
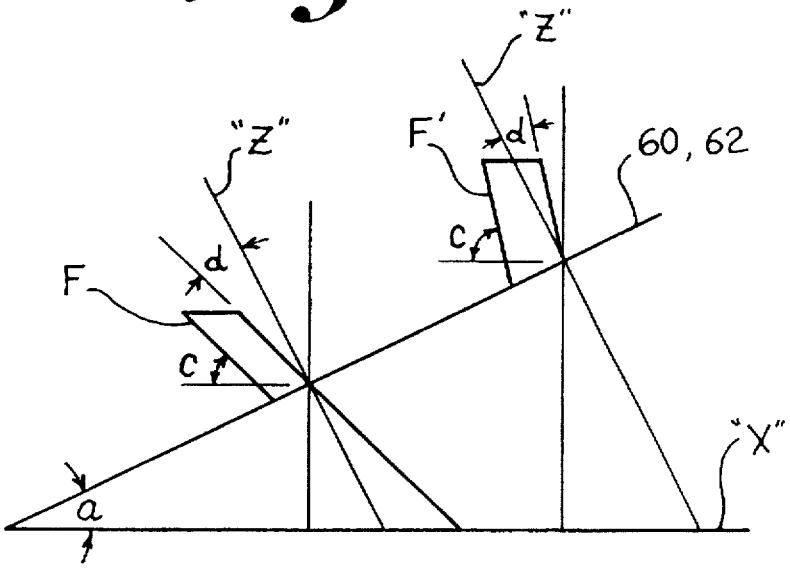
FIG. 11 is a schematic view of flight angles and root taper according to the invention.

As can best be seen in FIGS. 7 and 10, the feed and compression augers are machined with flights F leaning or inclined toward entry end 58. For example, the front faces of flights F are inclined at an angle "b" relatively to central axis "X" of the auger, and the rear face of the flights is inclined at an angle "c" to the same reference. The front and rear faces of the flights may be inclined the same or may be inclined at different angles. Preferably, angle "b" is inclined rearwardly less than 90° and *the complement of angle "b"* lies preferably in a range of about 15° to 18°. Angle "c" preferably is inclined at an angle less than 90° and *the complement of angle "c"* is preferably about 9°. The prior art flights have been oriented perpendicular or leaned forward with respect to the center line. The faces of the augers may also advantageously be inclined toward the entry end at a second angle "d" which is measured in reference to a perpendicular "Z" to the taper "A" of the auger root. One or [15] more faces of the auger flights may lean forward with respect to a perpendicular "Z" to the root taper, but be leaning [o] rearwardly with respect to the center line (see F' in FIG.11). In this case, the auger flights still lean rearwardly in accordance with the present invention and provide the advantages of the invention. The cross-section area ratio change and the flight angles provide for better loading of larger bone particles at the entry end. The grinder plate through which the material is fed to the entry end may then be provided with larger holes and the bone is not chopped up as much. There are fewer small bone pieces in the infeed material and resulting bone dust. Accordingly, there is less bone crush in the auger at the exit end and less calcium in the meat product.

When product enters entry flight 56a, it is directed toward root 60 of the auger. Product passing a leading edge 64 of the flight pushes the auger away from an exit end 66. This enhances the axial stability of the auger. This deep flight allows continuous and gradual compression of the infeed product. Compression begins immediately due to the fact that only the first flight is fed. By the time product leaves feed auger 40 it is compressed enough for soft material and liquid to be expressed through a sieve screen 70 at low pressure. Product (meat and bone material) is introduced into the feed auger by a reduced eccentric opening 72 located at the entry end of the feed auger producing an increased velocity without significant change to the TDH of the grinder. This allows product to enter quickly and continuously for better loading and enhances the rearward thrust of the auger. This loading capacity eliminates the need for a pump between the grinder and deboner. Product is introduced into first flight 56a only. Any opening on subsequent flights will allow pressure relief if the flight is full and centripetal force tends to push product back up the feed pipe it is opens over a second or third flight. Additionally, since augers typically have about six flights, any compression taking place must do so in the area near the exit since it is not possible near entry end 58. This means more cavitation near the entry end if the opening 58 cover more than one flight. Note that when a shallow flight is used, available capacity per revolution is reduced and the flight must cut off the material at the exit of the feed pig more times for the same amount of infeed product. This increases horse power requirements, as well as pulsing and cavitation. The entry end of the feed auger is smooth at 74 to prevent turbulence at the seal area. The end of the feed auger shaft is tapered to prevent damage to the seal when assembling the deboner.

Compression auger 42 is held in alignment by auger shaft 0 and is driven by four hardened and ground coupling ping 76, 78, 80, 82 in feed auger 40. Pins 76–82 fit into corresponding coupling holes 76a–82a formed in compression auger 42, as can best be seen in FIGS. 3 and 4. Angular position with respect to the feed auger is established by using one oversized pin 76 and matching hole 76a for that pin in the compression auger. This allows the flights to match exactly and act as a continuous flight. Thee coupling end 60a of feed auger 40 is not fitted into a second coupling end 62a of the compression auger thus allowing the taper to be a continuous (actually 9, 18° included angle) over the length of the two augers. An important benefit of the continuous taper is that the product does not have to change directions to enter the compression auger. This does not interrupt the flow pattern established in the feed auger. This gives the effect of a one piece auger without the problems associated with a one piece auger such as weight and the attendant cumbersome assembly and disassembly factors, uneven wear, cost of manufacture, cost of rebuild, and frequency of rebuild. On prior units where taper is changed when product passes from the feed auger to the compression auger, turbulence and cavitation cause a diminished product flow and increased temperature in the product. It is not uncommon to measure temperature rises in the 16° F. range in the finished product. This 9° taper allows the product to be continuously expressed outward as it travels the length of the auger. The continuous taper and deep flights are quite important because they allow the pre-compressed softer tissues and liquids to be expressed at low pressure at the entry end of the sieve screen. This allows adequate room for the remaining materials to move without excessive cavitation. As a result, the edible product still in the auger can be expressed through the sieve screen at low pressure until it reaches the exit end. Some products separate easily while others require more work to separate them. Deep flights F and continuous taper allow minimum pressure to be applied to do the job so that product which separates easily is expressed through the sieve screen near the entry end and progressively harder to separate product leaves nearer the exit end. Operation at low pressure is possible because the relatively deep flights allow room for any unseparated particles to move outward by contact with expanding root 60, 62 and centripetal force toward the sieve screen. Once there, they displace the relatively lighter separated bones toward the root of the auger with minimum cavitation. This action is important because the surface of the sieve screen remains filled with softer material reducing wear on the sieve screen and the lower friction reduces the horse power required. At the same time, the deeper flight offers less exposed bottom area to the bones at a smaller radius also lowering the horse power required. In one test using a 0.5 mm drilled sieve screen, 14500 lb./hour of turkey thigh bones and backs were processed at 0.66 yield at 44 horsepower. By comparison, prior units claim to process 10000 lb./hour at 75 horsepower. By the time product has traveled the length of the sieve screen, most edible material has been removed and mostly bones remain. These must be reduced in size to exit the machine via throttling ring valve 84. The depth of a last flight 56h at exit end 66 is dramatically less than that of the entry end so the bones are crushed by the time they reach the throttling ring valve. Note that the bones need only be crushed, not ground into powder, to escape through the valve. This means that only the pressure needed to reduce the bones is required. Very low working pressures are generated in this machine. The augers are vented to atmosphere through the sieve screen and throttling ring valve. At the rear of feed can 86, a seal 88 which can only hold 2 atmospheres at best is used successfully. Internal pressure on unseparated product can only be equal to the pressure required to push the edible portion through the sieve screen. Bones at exit end 66 are subjected to just enough pressure to reduce them small enough to pass by the throttling ring valve. The bursting strength of the sieve screen is approximately 1000 psi so it is not possible to generate radial pressures greater than the bursting strength. Based on the successful use of a 28 psi seal in the feed can, it is not possible to generate axial pressure greater than the seal can hold. Additionally, the pressure cannot exceed the pressure generated by the grinder, for if it did, material could not enter the deboner. Additionally, the available volume per second in the first flight is about 4 times the volume of product introduced into the machine at 1170 rpm. This means that about four revolutions are required to fill the flight. It is not possible to feel much pressure on a system which is not filled at all times. The temperature of the finished product is lower because less work is done on it. The liquid and softest parts leave near or at the entry end of sieve screen 70, and the remaining products stay cooler because less cavitation is taking place due to the depth of the auger. Measurements have shown a temperature gradient across the outside length of the sieve screen of 2° F. to 6° F. depending on the product from entry to exit, with temperature rise on the entry side of the sieve screen at 2° F. The increased volume of augers 40, 42 allows the separated bone to be easily displaced to the root of the auger to act as a heat sink for the auger. This, along with less cavitation, result in lower output product temperatures. The result of inadequate input product is to produce excess cavitation resulting in excess fat and heating in the finished product. It should not be possible to overfeed the deboner, but doing so should produce the same result as tightening the throttling ring valve too much since the excess flow will tend to push the augers forward and close the ring valve. The throttling ring valve must be adjusted for optimum throughput. Internal radial pressure at the exit is regulated by the adjustment of the throttling ring valve and entering bone particle size. Too loose will cause low yield, while too tight will reduce flow and cause the machine to take on the added functions of grinder and friction heater/drier. This will cause the finished product to have excessive calcium and fat and have excessive temperature rise. Excessive wear will appear on the exit side of the sieve screen and compression auger because that enclosed volume becomes a holding area for deboned product waiting to exit. Auger temperature will rise above 550° F. as evidenced by the dark blue discoloration of augers which have been operated in this fashion. Melted fat and calcium will bond to the surface of the exit end of the compression auger in a band about an inch wide and 0.125 inch thick. This adds to the restriction and compounds the problem.

At the front of the machine is an improved dual T-slot bar assembly 90, with hardened and ground T inserts 92, 94. These are hardened, ground, and coated to prevent bacteria buildup. The bar is secured by bolts and a bonding agent to prevent bacteria from building up beneath it. The provided clamp load is over 200,0000 lb. to keep it in place and assure front end rigidity. This insures the stability and perfect alignment of a sliding block assembly 96 which supports the bone exit can 66, and throttling ring 84, and sieve screen 70. This is important because the life of sieve screen 70 depends on the alignment of sliding block assembly 96, and production is enhanced because the auger stays centered in the sieve screen. The improved alignment will result in increased machine life or time between overhauls into which are embedded T-inserts 92 which are fastened and chemically bonded to it to prevent bacteria buildup. The sliding block assembly in turn holds the bone exit can 66 and throttling ring valve 64. The T-slot bar holds the sliding block assembly 96. The reactive force to auger thrust is felt here via the product in the auger. Prior units have sliding blocks made from aluminum with no inserts. This means that it will wear and become misshaped with use, and misalignment with its attendant problems will appear. In the present invention, the sliding T-inserts will prevent wear on the sliding block during assembly and disassembly. The front end stability of the casting is improved by the use of two integral extensions 98, 100 supporting the auger shaft bearing. The stability of the front of the casting is further improved by the dual T-slot bar which is permanently bonded by a bonding agent with 3000 psi. compression strength. Further, the bolts holding the T-slot bar are bonded into their bolt holes with the same agent. This casting/dual T-bar assembly becomes an integral unit which is much stronger than a casting alone.

Auger shaft 50 is supported on the end opposite the spiral grove 54 by an auger shaft bearing 102. Bearing 102 prevents the auger shaft from whipping thus assuring alignment of feed auger 40, compression auger 42, sliding block assembly 96, bone exit can 66, throttling ring 84 and sieve screen 70.

While a preferred embodiment of the invention has been described using specific terms, such description is for illustrative purposes only, and it is to be understood that changes and variations may be made without departing from the spirit or scope of the following claims.

What is claimed is:

1. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat; wherein said apparatus comprises:

an auger having a plurality of sections which include a feed auger and a compression auger integrally coupled together;

said feed auger and compression auger having a continuous tapered root along substantially their entire coupled total length;

said root having a root cross-section area which varies along its length;

flights carried by said auger root having a generally constant outside diameter representing a flight cross-section area which is generally constant over the length of said flights;

said auger having a cross-section area ratio at a given point along its length defined by the ratio of said flight cross-section area to said root cross-section area; and said cross-section area ratio having a change greater than 2.3:1 over the length of said auger.

2. The apparatus of claim 1 wherein said flights and said tapered root of said feed auger and compression auger are constructed as one-piece eliminating welds between the auger flights and auger root and enhancing the sanitation of said auger.

3. The apparatus of claim 2 wherein said auger is constructed from an H13 tool steel material.

4. The apparatus of claim 2 wherein said feed and compression augers are heat treated and include a non-porous coating having a hardness of approximately 72 on the C scale reducing friction and horse power requirements.

5. The apparatus of claim 1 wherein said flights have front and rear faces and at least one of said front and rear faces is inclined toward said entry end of said auger at an angle less than 90 degrees with respect to the axis of said auger assisting the outward flow of material toward said sieve screen.

6. The apparatus of claim 5 wherein said at least one face is inclined at a second angle with respect to a perpendicular to said the taper of said root.

7. The apparatus of claim 6 wherein said at least one face is inclined at said second angle forward of said perpendicular.

8. The apparatus of claim 1 wherein said motor coupling includes a plurality of drive pins carried by one of said motor coupling and feed auger, and a plurality of corresponding drive holes carried by the other of said motor coupling and feed auger which mate together to couple said motor coupling and feed auger together and provide a slip fit which holds said motor coupling and feed auger in place by the pressure from the operation of said auger and which facilitates quick disassembly and assembly of said auger.

9. The apparatus of claim 8 wherein said motor coupling includes a housing shaft having a drive socket formed therein, and said feed auger includes a stub shaft which fits in said socket and includes at least one longitudinal bore, and at least one substantially radial bore communicating with said longitudinal bore to ambient conditions to relieve air in said socket when said motor coupling and auger are fitted together axially.

10. The apparatus of claim 1 including:

said feed auger having a first coupling end;

said compression auger having a second coupling end for mating with said first coupling end of said feed auger so that said auger root has a continuous taper and flight;

an auger shaft which extends through said compression auger and connects to said feed auger, and said auger shaft having a spiral groove carried on one end;

a hollow bore formed within said feed auger, and a locking pin extending radially within said hollow bore for engaging within said spiral groove of said auger shaft and connecting said compression auger, feed auger, and auger shaft together; and an auger coupling for coupling said first coupling end of said feed auger and said second coupling end of said compression auger together.

11. The apparatus of claim 10 wherein said spiral groove of said auger shaft comprises an extended groove portion which prevents said auger shaft from becoming unlocked in the event that said drive motor is operated in a reverse direction.

12. The apparatus of claim 10 wherein said auger coupling comprises a plurality of coupling pins carried by one of said feed auger and compression auger; and a plurality of corresponding coupling holes formed in the other of feed auger and said compression auger which mate with said coupling pins to lock said feed auger and compression auger together in a drive connection.

13. The apparatus of claim 12 wherein one of said coupling pins and holes have a different configuration from the other of said coupling pins and holes to align said feed and compression augers.

14. The apparatus of claim 1 wherein said auger root has a taper which is greater than about 5° and is continuous along the length of said feed auger and compression auger so that the flights of said auger means at said entry end are substantially deeper than at said exit end to allow more meat and bone material to be introduced to the first cavity of said auger flights.

15. The apparatus of claim 1 wherein said cross-section area ratio change of said tapered auger root from said entry end to said exit end is about 8:1.

16. The apparatus of claim 1 wherein said feed can inlet includes a reduced eccentric opening disposed near said entry end of said feed auger to increase the loading capacity of said feed auger.

17. The apparatus of claim 1 wherein said feed can inlet of said housing includes an entry opening disposed relative to said auger for introducing meat and bone material into only one flight of said auger to prevent subsequent pressure relief in downstream flights and back-up of said product in said inlet.

18. The apparatus of claim 1 including a bearing housing;

a housing shaft carried within said bearing housing;

a first bearing carried by a first end of said housing, and a second bearing carried by a second end of said housing; and a thrust bearing carried by an intermediate portion of said housing;

whereby said drive shaft is carried by said first and second bearings for rotation and against axial thrust by said thrust bearing.

19. The apparatus of claim 18 including:

mounting blocks for mounting said bearing housing to an associated frame; and said mounting blocks engaging said bearing housing in a friction fit heat exchange contact which transfers heat from said bearing housing to ambient environment.

20. The apparatus of claim 19 including an oil bath carried within said bearing housing for cooling said bearings and housing shaft so that said bearing housing effectively serves as a heat sink to remove heat through said oil, said housing, and said mounting blocks to ambient.

21. The apparatus of claim 20 wherein said bearing housing includes a breather means for allowing said oil bath in bearing housing to communicate with said ambient environment and prevent over lubrication of the bearings.

22. The apparatus of claim 18 wherein said motor coupling comprises a flexible coupling means for coupling said drive motor shaft and said housing shaft and for allowing said motor shaft to find and operate toward said its magnetic center.

23. The apparatus of claim 22 including longitudinal adjustment means carried by said flexible coupling allowing said housing shaft to move with said motor shaft at magnetic center and pre-load said thrust bearing when said motor shaft is located at said magnetic center.

24. The apparatus of claim 1 wherein said flights have a depth in a range of about 1.0 inch to 1.8 inches at said entry end.

25. Meat deboning apparatus for separating meat from bone material of the type having a drive motor with a motor shaft, an auger for conveying said meat and bone material; a motor coupling for coupling auger to said drive motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat; wherein said apparatus comprises:

an auger having a plurality of sections which include a feed auger and a compression auger aligned along an auger axis and integrally coupled together;

said feed auger and compression auger having a continuous tapered root along substantially their entire coupled length; and helical flights carried by said auger root having at least one face inclined toward said entry end of said auger at a first angle less than 90° with respect to said auger axis and a second angle inclined to said taper of said root thereby assisting the outward flow of material toward said sieve screen.

26. The apparatus of claim 25 wherein:

said root has a root cross-section area which varies along its length;

said flights have a generally constant outside diameter representing a flight cross-section area which is generally constant over the length of said flights;

said auger having a cross-section area ratio at a given point along its length defined by the ratio of .said flight cross-section area to said root cross-section area; and said cross-section area ratio having a change greater than 2.3:1 over the length of said auger.

27. The apparatus of claim 26 wherein said auger root has a cross-section area ratio change of about 8.

28. The apparatus of claim 25 wherein said auger flights include an entry flight having a depth of about 1 to 1.8 inches.

29. The apparatus of claim 25 wherein said second angle is inclined rearwardly with respect to the taper of said root.

30. The apparatus of claim 25 wherein said second angle is inclined forwardly with respect to the taper of said root, but is less than 90° to the perpendicular to said axis.

31. The apparatus of claim 25 wherein said flights have a front face and a rear face, and said front face is inclined at a first angle in a range of about 15 to 18 degrees.

32. The apparatus of claim 25 wherein said rear face is inclined at a first angle of about 9°.

33. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after reparation from said meat; wherein said apparatus comprises:

said auger having a plurality of sections which include a feed auger and a compression auger;

a first coupling for coupling said feed auger to said motor coupling which includes:

a feed auger shaft;

a socket carried by said motor coupling with which slidably receives said feed auger shaft;

a plurality of drive pins carried by one of said feed auger shaft and said socket, and a plurality of corresponding holes formed in the other of said feed auger shaft and socket so that said drive pins are received in said holes to couple said feed auger shaft and said motor coupling in a drive connection; and a second coupling for coupling said feed auger and compression auger in a second drive connection.

34. The apparatus of claim 33 including bore means formed in said feed auger shaft to vent air in said socket to ambient conditions as said feed auger shaft slides into said socket.

35. The apparatus of claim 34 wherein said bore means includes at least one longitudinal bore formed in an axial direction in said feed auger shaft, and at least one substantially radial bore formed in said feed auger shaft communicating with said longitudinal bore and ambient conditions outside of said socket to relieve air in said socket as said feed auger shaft slides therein.

36. The apparatus of claim 33 wherein said second coupling comprises;

an auger shaft;

a hollow bore formed in a first coupling end of said feed auger;

a locking pin carried in a radially extending manner within said hollow bore;

a spiral groove formed in a first end of said auger shaft which slidably receives said locking pin with said auger shaft inserted in said hollow bore while passing through said compression auger; and a second coupling end of said compression auger which mates with said first coupling end of said feed auger to form said second drive connection.

37. The apparatus of claim 34 wherein said second coupling comprises:

a plurality of coupling pins carried by one of said first coupling end and said second coupling end, and a plurality of correspondingly shaped coupling holes formed in the other of said first coupling end and said second coupling end; and one of said coupling pins and correspondingly shaped coupling holes having a different shape from the remainder of said coupling pins and holes so that said feed auger and compression auger are aligned and coupled together with said auger flights and root being continuous.

38. The apparatus of claim 33 wherein said spiral groove of said auger shaft includes a first portion in which said locking pin is received and a second extended groove portion in which said locking pin travels in the event of reverse operation of said auger to prevent uncoupling of said auger shaft.

39. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat; wherein said apparatus comprises:

a low pressure housing containing said auger;

a low pressure seal at a first end of said feed can through which a shaft of said feed auger extends;

a low pressure sieve screen for separating said meat from said bone material; and said auger having a plurality of deep flights including an entry flight means at said entry end of said auger for providing a volume per second greater than the feed rate of product fed to said feed can and entry flights;

whereby low pressure is present in said auger system during deboning reducing the temperature rise in the deboned product: and said entry flight means includes an entry flight having a depth equal to or greater than about 1.7 inches.

40. The apparatus of claim 39 wherein said low pressure seal seals a pressure substantially less than the bursting pressure of said sieve screen which is up to about 1000 psi.

41. The apparatus of claim 40 wherein the pressure of said low pressure seal is 28 psi.

42. The apparatus of claim 40 wherein said inlet of said feed can includes a reduced, eccentric opening through which product is introduced into said feed auger.

43. The apparatus of claim 42 wherein eccentric opening feeds product to said entry flight of said feed auger only.

44. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat; wherein said apparatus comprises:

bearing housing assembly;

a housing shaft carried within said bearing housing assembly;

a first radial bearing disposed in said bearing housing assembly, said first radial bearing carrying said housing shaft near a first end of said bearing housing assembly;

a second radial bearing disposed in said bearing housing assembly, said second radial bearing carrying said housing shaft near a second end of said housing assembly;

a thrust bearing disposed in said bearing housing assembly between said first and second radial bearings for supporting said housing shaft; and an oil bath in said bearing housing assembly for bathing said radial bearings and thrust bearing in oil.

45. The apparatus of claim 44 including:

heat conductive mounts for mounting said housing assembly which act as a heat sink for conducting heat from said housing assembly; and said oil bath serving as a lubricant for said bearings and to carry heat away from said bearings to said heat conductive mounts where said heat is dissipated to the atmosphere.

46. The apparatus of claim 44 wherein said first and second radial bearings are rated for speeds in excess of the operating speeds of said auger.

47. The apparatus of claim 44 including an oil breather assembly carried by said housing which allows excess oil to escape from said housing assembly to prevent over lubrication and to prevent a vacuum from forming when the housing assembly cools to prevent water from being drawn past seals in said housing assembly into the interior of said housing assembly.

48. The apparatus of claim 44 wherein said first and second radial bearings are self aligning bearings which causes said housing shaft to be self centered in the housing assembly at operating speeds and establishes correct alignment for said thrust bearing disposed between said radial bearings.

49. The apparatus of claim 48 wherein said thrust bearing consists of a deep groove ball bearing.

50. The apparatus of claim 44 including magnetic centering means coupling said motor shaft and housing shaft for causing a motor rotor of said drive motor to seek its magnetic center and pull said auger shaft toward that position to preload said thrust bearing in said housing assembly.

51. The apparatus of claim 50 wherein said magnetic centering means comprises a flexible coupling which includes a first flexible coupling and a second flexible coupling; said first flexible coupling being connected to said motor shaft and said second flexible coupling being connected to said housing shaft; and a gap separating said first and second flexible couplings, and means for adjusting said gap to adjust the amount of pre-loading on said thrust bearing.

52. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat; wherein said apparatus comprises:

bearing housing assembly;

a housing shaft carried within said bearing housing assembly;

self-aligning bearing means for carrying said housing shaft in said housing assembly; and magnetic centering means coupling said motor shaft and housing shaft for causing a motor rotor of said drive motor to seek its magnetic center and pull said auger shaft toward that position to pre-load said thrust bearing in said housing assembly.

53. The apparatus of claim 52 wherein said magnetic centering means comprises a flexible coupling which includes a first flexible coupling and a second flexible coupling; said first flexible coupling being connected to said motor shaft and said second flexible coupling being connected to said housing shaft; and a gap separating said first and second flexible couplings, and means for adjusting said gap to adjust the amount of pre-loading on said thrust bearing.

54. The apparatus of claim 53 including a thrust bearing disposed in said housing between for supporting said housing shaft against axial thrust.

55. Meat deboning apparatus for separating meat from bone material of the type having a drive motor with a motor shaft, an auger for conveying said meat and bone material; a motor coupling for coupling said auger to said motor shaft; a housing surrounding said auger including a feed can having an inlet into which said meat and bone material are fed to an entry end of said auger, and a sieve screen through which said meat passes to separate meat from said bone material; and an outlet carried by said housing through which said bone material passes after separation from said meat wherein said apparatus comprises:

a frame;

a T-slot bar assembly carried by said frame;

a plurality of lower T-inserts having a widened base and a narrow stem;

a plurality of upper T-inserts having a widened top and a narrow stem for being slidably received in said T-slots of said bar assembly;

a sliding block assembly carried by said upper and lower T-inserts which supports said bone exit can and said throttling ring: and means for securing said sliding block assembly and T-inserts, together

56. The apparatus of claim 55 including a bonding agent securing said T-bar assembly and said frame together.

57. The apparatus of claim 55 wherein said bar assembly comprises T-slots having a widened groove extending across said bar assembly terminating in a narrow groove which opens outwardly on the top of said bar assembly;

said widened base and narrow stem of said lower T-inserts being slidably received in said widened groove and narrow groove of said T-slots respectively; and said narrow stem of said upper T-inserts being slidably received in said narrow slot.

58. In a meat deboning apparatus for separating meat from bone material of the type having a drive motor; an auger for conveying said meat and bone material; a motor coupling for coupling said auger to said drive motor shaft; a housing surrounding said auger including a feed can having an inlet into which said meat and bone material are fed to an entry end of said auger, a sieve screen through which said meat passes to separate meat from said bone material; and an outlet carried by said housing through which said bone material passes after separation from said meat; a method for making said auger which comprises:

machining said feed auger and said compression auger from a one-piece stock of material to form a feed auger having a one-piece auger root and auger flights and a compressive auger having a one-piece auger root and auger flights so that there are no welds occurring in said augers between said auger roots and auger flights; and machining said auger from a material having a close grain structure which significantly prevents bacteria from penetrating said material.

59. The method of claim 58 including milling said auger from a H13 tool steel material.

60. The method of claim 58 including heat treating said machined auger.

61. The method of claim 58 including coating said machined auger with a non-porous coating having a hardness of at least 72 on the C scale.

62. The method of claim 58 including providing a support for said auger housing which includes a bone exit can and throttling ting supported on a slidable block carried on a stationary frame wherein the method includes chemically bonding and mechanically fastening a bar to said frame on which said slidable block is carried.

63. An auger for conveying material within a housing having an entry end and an exit end comprising:

a tapered root having a constant taper along substantially the entire length of said auger;

said root having a root cross-section area which varies along its length:

flights carried by said auger root having a generally constant outside diameter representing a flight cross-section area which is generally constant over said length of said auger root;

said auger having a cross-section area ratio at a given point along its length defined by the ratio of said flight cross-section area to said root cross-section area; and said cross-section area ratio of said auger having a change greater than about 2.3 to 1 over the length of said auger.

64. The device of claim 63 wherein said auger root has a cross-section area ratio change of about 8:1.

65. The device of claim 63 where at least one face of said flight is leaned toward the entry end of said housing with respect to the center axis of said auger.

66. The device of claim 65 wherein said at least one face is leaned toward said entry end of said housing at an angle in a range of about 15 to 18 degrees.

67. The device of claim 66 wherein said flights include an opposing face which is leaned towards said entry end at an angle of about 9 degrees.

68. The device of claim 63 wherein said flights are leaned toward the entry end of said housing at an angle and range of about 9 to 45 degrees.

69. An auger for conveying material through a housing having an entry end and an exit- end comprising:

a tapered root having a generally constant taper over the length of said auger;

flights carried by said auger having a front face and a rear face; and at least one of said front and rear faces being inclined toward an entry end of said housing at a first angle less than 90 degrees with respect to a center axis of said auger and at a second angle which is inclined with respect to a perpendicular to the taper of said root.

70. The device of claim 69 wherein said at least one face is inclined forward with respect to said perpendicular to the taper of said root.

71. The device of claim 69 wherein said at least one face is inclined rearwardly with respect to said perpendicular to the taper of said root.

72. The device of claim 69 wherein said root has a root cross-section area which varies along its length;

said flights have a generally constant outside diameter representing a flight cross-section area which is generally constant over the length of said flights;

said auger having a cross-section area ratio at a given point along its length defined by the ratio of said flight cross-section area to said root cross-section area; and said cross-section area ratio having a change greater than 2.3:1 over the length of said auger.

73. The apparatus of claim 72 wherein said auger root has a cross-section area ratio change of about 8.

*74. Meat deboning apparatus for separating meat from bone material of the type having a drive motor with a motor shaft, an auger for conveying said meat and bone material; a motor coupling for coupling said auger to said drive motor shaft; a housing surrounding said auger including a feed can having an inlet into which said auger including a feed can having an inlet into which said meat and bone material are fed to an entry end of said auger, and a sieve screen through which said meat passes to separate meat from said bone material; and an outlet carried by said housing through which said bone material passes after separation from said meat, wherein said apparatus comprises:*

*an auger having an entry end and an exit end disposed along an auger axis;*

*said auger having an auger root along substantially its entire length; and*

*a plurality of helical flights carried by said auger root having at least one face inclined rearwardly toward said entry end of said auger at a first angle less than 90° thereby assisting the outward flow of material toward said sieve screen.*

*75. The apparatus of claim 74 wherein said helical flights have a second face inclined rearwardly toward said entry end at a second angle less than 90°.*

*76. The apparatus of claim 75 wherein said first and second angles are different angles.*

*77. The apparatus of claim 74 wherein said flights have a front face and a rear face, and said front face is inclined rearwardly in a range of about 15° to 18°.*

*78. The apparatus of claim 77 wherein said rear face is inclined rearwardly at about 9°.*

*79. The apparatus of claim 74 wherein said auger root has a generally continuous taper along its length, and said first face is inclined to said taper of said root.*

*80. The apparatus of claim 79 wherein said first face is inclined rearwardly with respect to the taper of said root.*

*81. The apparatus of claim 79 wherein said first face is inclined forwardly with respect to a perpendicular to the taper of said root, but is less than 90° to a perpendicular to said auger axis.*

*82. The apparatus of claim 79 wherein:*

*said root has a root cross-section area which varies along its length;*

*said flights have a generally constant outside diameter representing a flight cross-section area which is generally constant over the length of said flights;*

*said auger having a cross-section area ratio at a given point along its length defined by the ratio of said flight cross-section area to said root cross-section area; and*

*said cross-section area ratio having a change greater than 2.3: 1 over the length of said auger.*

*83. The apparatus of claim 82 wherein said auger root has a cross-section area ratio change of about 8.*

*84. The apparatus of claim 74 wherein said auger flights include an entry flight having a depth of about 1 to 1.8 inches.*

* * * * *